United States Patent [19]

DeRosa et al.

[11] Patent Number: 5,094,765
[45] Date of Patent: Mar. 10, 1992

[54] LUBRICATING OIL COMPOSITION

[75] Inventors: Thomas F. DeRosa, Passaic, N.J.;
Maria M. Kapuscinski, Carmel, N.Y.;
Rosemary J. Jennejahn, Nelsonville,
N.Y.; Theodore E. Nalesnik,
Wappinger Falls, N.Y.

[73] Assignee: Texaco Inc., White Plains, N.Y.

[21] Appl. No.: 516,383

[22] Filed: Apr. 30, 1990

[51] Int. Cl.$^5$ ............... C10M 149/04; C10M 149/02
[52] U.S. Cl. ..................... 252/51.5 R; 525/331.7;
525/374; 525/375
[58] Field of Search ............ 525/331.7, 374, 375;
252/51.5 R

[56] References Cited

U.S. PATENT DOCUMENTS

| | | | |
|---|---|---|---|
| 4,262,099 | 4/1981 | Heaps et al. | 525/374 |
| 4,902,601 | 2/1990 | Potts et al. | 525/374 |
| 4,952,637 | 8/1990 | Kapuscinski et al. | 525/331.7 |

*Primary Examiner*—Prince Willis, Jr.
*Assistant Examiner*—Ellen McAvoy
*Attorney, Agent, or Firm*—Robert A. Kulason; James J. O'Loughlin; Vincent A. Mallare

[57] ABSTRACT

A dispersant and viscosity index improver for lubricating oils containing an EPR or EPT polymer onto which has been free radically grafted an unsaturated urethane or unsaturated urea.

28 Claims, No Drawings

LUBRICATING OIL COMPOSITION

BACKGROUND OF THE INVENTION

This invention relates to a multi-functional lubricant additive which is a viscosity index improver (VII) and which also imparts enhanced dispersany when employed in a lubricating oil composition.

DISCLOSURE STATEMENT

The art is replete with disclosures on the use of polymer additives in lubricating oil compositions. Ethylene-propylene copolymers and ethylene-alpha olefin non-conjugated diene terpolymers which have been further derivatized illustrate this type of oil additive.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene copolymer and used as a viscosity index improver for lubricating oils.

U.S. Pat. No. 4,146,489 discloses a graft copolymer where the polymer backbone is an oil-soluble ethylene-propylene copolymer or an ethylene-propylene-diene modified terpolymer with a graft monomer of 2- or 4-vinylpyridine or N-vinylpyrrolidone to provide a dispersant VI improver for lubricating oils.

U.S. Pat. No. 4,340,689 discloses a process for grafting a functional organic group onto an ethylene-propylene copolymer or an ethylene-propylene-diene terpolymer.

U.S. Pat. No. 4,780,228 discloses the grafting of a hydrocarbon polymer in the absence of a solvent in the presence of a free radical initiator and a claim-stopped agent followed by a reaction with an amine, polyol or an aminoalcohol.

The disclosures in the foregoing patents which relate to VI improvers and dispersants for lubricating oils, namely U.S. Pat. Nos. 3,522,180; 4,026,809; 4,146,489; 4,340,689; and 4,780,228 are incorporated herein by reference.

An objective of this invention is to provide a novel graft copolymer composition that behaves as a viscosity index improver with enhanced dispersancy. Another object of the invention is to provide a multifunctional lubricant additive that behaves as a viscosity index improver, and imparts enhanced dispersancy to the lubricating oil composition.

A further objective is to provide a novel lubricating oil composition containing the graft copolymer additive of the invention as well as to provide concentrates of the novel additive of invention.

SUMMARY OF THE INVENTION

This invention provides a method of preparing a lubricating oil composition additive. The method comprises;

a) reacting a polymer having a number average molecular weight ranging from about 5,000 to 500,000 and prepared from ethylene and at least one ($C_3$–$C_{10}$) alpha-monoolefin and, optionally, a polyene selected from the group consisting of a non-conjugated diene and a triene, said polymer comprising from about 15 to 80 mole percent of ethylene from about 20 to 85 mole percent of said ($C_3$–$C_{10}$) alpha- monoolefin and from about 0 to 15 mole percent of said polyene which has been reacted with a urethane/urea selected from the group consisting of:

i) an unsaturated aliphatic urethane obtained by reacting an unsaturated aliphatic isocyanate and an aliphatic or aromatic alcohol;

ii) an unsaturated aliphatic urea obtained by reacting an unsaturated aliphatic isocyanate and an aliphatic or aromatic amine;

iii) an unsaturated aromatic urethane obtained by reacting an unsaturated aromatic isocyanate and an aliphatic or aromatic alcohol; and iv) an unsaturated aromatic urea obtained by reacting an unsaturated aromatic isocyanate and an aliphatic or aromatic amine, to provide a lubricating oil composition additive product; and b) recovering said lubricating oil composition additive product.

DETAILED DESCRIPTION OF THE INVENTION

The lubricant of this invention comprises an oil of lubricating viscosity and an effective amount of the novel reaction additive product. The lubricating oil is characterized by behaving as a viscosity index improver with enhanced dispersant propertties. This invention comprises a chemical modification of an ethylene copolymer or terpolymer. More specifically, this invention entails the free radical incorporation of unsaturated ureas or urethanes to a polymeric substrate. It is a two step process comprising (1) the monomer preparation and (2) the monomer grafting to polymeric a substrate.

STEP 1. PREPARATION OF UNSATURATED URETHANE OR UREA MONOMERS

Unsaturated urethanes and ureas that are amenable to chemical grafting were prepared according to Equations 1 and 2, respectively, Equation (1)

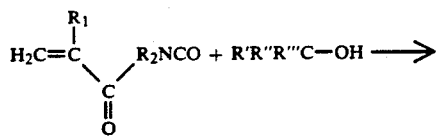

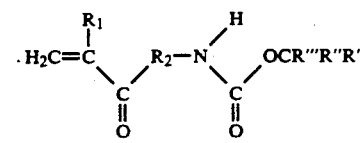

Unsaturated Urethane

Equation (2)

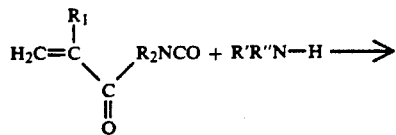

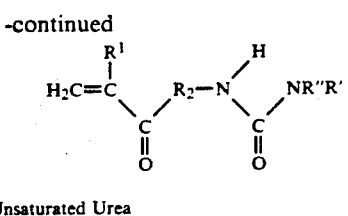

Unsaturated Urea wherein $R_1$ is an organic polymerizable group such as methacryl or benzyl; $R_2$ is an organic linear, cyclic, or heterocyclic, and aromatic or heteroaromatic unit composed of hydrocarbon and/or one or more atoms of oxygen, nitrogen, sulfur, or phosphorus; $R'$ is hydrogen or a lower alkyl $R''$ is hydrogen atom, lower alkyl, or cyclic alkyl or hetero-cyclic group containing two or fewer heteroatoms of oxygen, nitrogen, sulfur, or phosphorous; and $R'''$ is a substituted or unsubstituted phenylene ring containing two or fewer heteroatoms of oxygen, nitrogen, sulfur or phosphorous.

STEP 2. FREE RADICAL GRAFTING OF UNSATURATED URETHANE OR UREA MONOMER TO THE POLYMERIC SUBSTRATE

The aforementioned unsaturated urethanes and ureas are chemically grafted to ethylene co- or terpolymers by reacting with a free radical initiator at elevated temperatures as shown below, respectively, in Equations 3 and 4.

Equation (3)

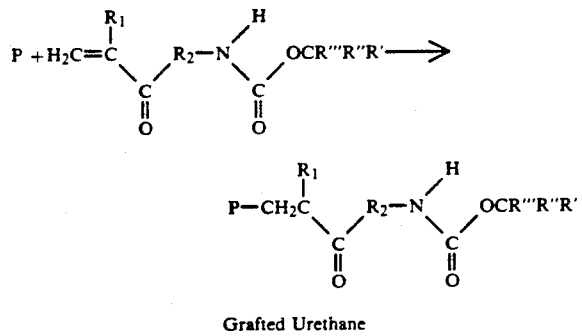

Grafted Urethane

Equation (4)

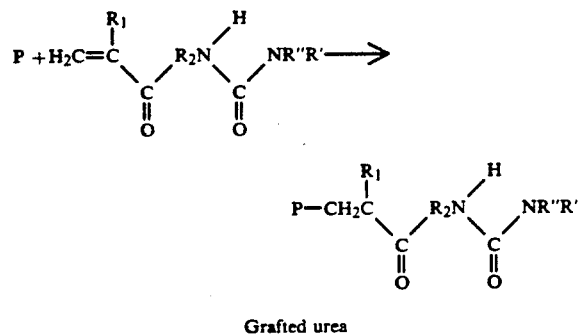

Grafted urea wherein P is an ethylene-propylene copolymer or ethylenepropylene terpolymer substrate; and $R_1$, $P_2$, $R'$, $R''$, and $R'''$ are as previously defined above.

The polymer substrate employed in the additive of the invention may be prepared from ethylene or propylene or it may be prepared from ethylene and a higher olefin with ($C_3$–$C_{10}$) alpha-olefins.

More complex polymer substrates, often designated as interpolymers, may be prepared using a third component. The third component generally used to prepare an interpolymer substrate is a polyene monomer selected from the group consisting of a non-conjugated diene and a triene. The non-conjugated diene component is one having from 5 to 14 carbon atoms in the chain.

The diene monomer is characterized by the presence of a vinyl group in its structure and can include cyclic and bicyclo compounds. Representative dienes include 1,4-hexadiene, 1,4-cyclohexadiene, dicyclopentadiene, 5-methylene-2-norborene, 1,5-heptadiene, and 1,6 octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1isopropylidenedicyclopentadiene, dehydroisodicyclopentadiene, and 2-(2-methylene-4-methyl-3-pentenyl)-[2.2.I]bicyclo-5h.eptene.

The polymerization reaction to form the polymer substrate is generally carried out in the presence of a catalyst in a solvent medium. The polymerization solvent may be any suitable inert organic solvent that is liquid under reactions conditions for solution polymerization of monoolefins which is generally conducted in the presence of a Ziegler-Natta type catalyst. Examples of satisfactory hydrocarbon solvents include linear chain paraffins having from 5–8 carbon atoms, hexane being preferred; aromatic hydrocarbons, preferably those hydrocarbons having a single nucleus, such as benzene, toluene and the like; and saturated cyclic hydrocarbons having boiling point ranges approximating those of the straight chain paraffinic hydrocarbons and aromatic hydrocarbons described above, are particularly suitable solvents. The solvent selected may be a mixture of one or more of the foregoing hydrocarbons. It is desirable that the solvent be free of substances that will interfere with the Ziegler-Natta polymerization process.

In a typical preparation of the polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury and dry ethylene and 5-ethylidene-2norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a ($C_3$ to $C_{10}$) alpha monoolefin with the most preferred proportions being from 25 to 55 mole percent ethylene and 45 to 75 mole percent propylene.

Terpolymer variations of the foregoing polymers may contain from about 0.1 to 10 mole percent of a non-conjugated diene or triene.

The polymer substrate, that is the ethylene copolymer or terpolymer is an oil-soluble, substantially linear, rubbery material having a number average molecular weight from about 5,000 to about 500,000 with a preferred number average molecular weight range of about 25,000 to about 250,000 and the most preferred range from about 50,000 to about 150,000.

The terms polymer and copolymer are used generically to encompass ethylene copolymers, terpolymers or interpolymers. These materials may contain minor amounts of other olefinic monomers so long as their basic characteristics are not materially changed.

The unsaturated urea or urethane may be grafted onto the polymer in a number of ways. It may be grafted onto the backbone by a thermal process known as the "ene" process or by grafting in solution using a free radical initiator. Free radical solution-grafting of unsaturated urethanes or ureas in non-polar solvents containing 5-9 carbon atoms or monoaromatic solvents, is the preferred method of incorporation, however.

These free radical solution grafting reactions are performed at an elevated temperature in the range of about 100° C. to 250° C., preferably 120° C. to 190° C., and more preferably at 150° C. to 180° C., e.g. above 160° C., in a solVent, preferably a mineral lubricating oil solution, containing, e.g. 1 to 50, preferably 5 to 30 wt% bases on the initial total oil solution, of the ethylene polymer and preferably under an inert atmosphere.

The free radical initiators which may be used are peroxides, hydroperoxides, and azo compounds and preferably those which have a boiling point greater than 100° C. and decompose thermally within the grafting temperature range to provide free radicals. Representative of these free radical initiators are azobutronitrile and 2,5-dimethyl-hex-3-yne-2,5-bis tertiary-butyl peroxide. The initiator is used in an amount of between 0.005% and about 1% by weight based on the weight of the reaction mixture solution. The grafting is preferably carried out in an inert atmosphere, preferably nitrogen. The resulting polymer is characterized by having a saturated urea or urethane function within its structure.

Polymer substrates or interpolymers are available commercially. Particularly useful are those containing from about 40 to 60 mole percent ethylene units, about 60 to 40 mole percent propylene units. Examples are "Ortholeum 2052" and "PL-1256" available from E.I.- duPont deNemours and Company of Wilmington, Del. The former is a terpolymer containing 48 mole percent ethylene units, 48 mole percent propylene, and 4 mole percent 1,4-hexadiene units, having an inherent viscosity of 1.35. The latter is a similar polymer with a inherent viscosity of 1.95. The viscosity average molecular weights of the two are on the order of 200,000 and 280,000, respectively.

In the present method for preparing the polymer, the polyene may be reacted with an unsaturated aromatic-/aliphatic urethane or aromatic/aromatic urea that each may be obtained by reacting an unsturated aliphatic-/aromatic isocyanate and either an aliphatic/aromatic alcohol or an aliphatic/aromatic amine.

According to the present invention, the preferred aliphatic isocyanate is isocyanate ethylmethacrylate and the aromatic isocyanate is m-isopropenyl-a,a-dimethyl-benzyl isocyanate.

The preferred aliphatic alcohol is4-hydroxyl-2, 2, 6, 6-tetramethyl-piperdine. The preferred aromatic alcohol is 2,6-di-t-butyl-4-hydroxylmethyl-phenol.

Moreover, the preferred aliphatic amines is 1-(3aminopropyl) piperdine, N-aminopropyl morpheline, N-methyl piperzine, or 1-(3-aminopropyl)-2-pipecoline. Finally, the preferred aromatic amine is 2-amionopyridine.

THE UNSATURATED URETHANE OR UREA GRAFT FUNCTION MONOMER

An essential feature of all grafting monomers in this invention is the presence of ethylenical unsaturation. Moreover, since it is desirable to avoid crosslinking reactions during grafting, only one site of ethylenical unsaturation is contained within each monomer. Monomers are prepared by reacting unsaturated isocyanates with alcohols or amines to generate urethanes and ureas, respectively, as represented by the following formulas

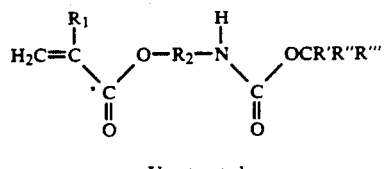

Unsaturated Urethane

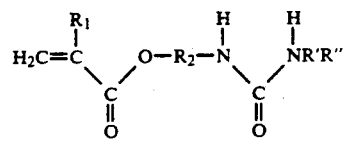

Unsaturated Urea wherein $R_1$ represents a hydrocarbon selected from the group consisting of alkyl, aralkyl, cycloalkyl, aryl, and alkaryl, including such radicals when inertly substituted. When $R_1$ is alkyl, it may typically be methyl, ethyl, n-propyl, n-butyl, i-butyl, sec-butyl, amyl, octyl, decyl, octadecyl, etc. When $R_1$ is aralkyl, it may typically be benzyl, beta-phenylethyl, etc. When $R_1$ is cycloalkyl is may typically be cyclohexyl, cycloheptyo, cyclooctyl, 2-methylcycloheptyl, 3-butylcyclohexyl, 3-methylcyclohexyl, etc.

When $R_1$ is aryl, it may typically be phenyl, naphthyl, etc. When $R_1$ is alkaryl, it may typically be tolyl, xylol, etc. $R_1$ may be inertly substituted, i.e., it may bear a nonreactive substituent such as alkyl, aryl, cycloalkyl, ether, etc. Typically inertly substituted $R_1$ groups may include 2-ethoxyethyl, carboethoxymethyl, 4-methylcyclohexyl, etc. The preferred $R_1$ groups may be lower alkyl, i.e., ($C_1$–$C_{10}$) alkyl groups including, i.e., methyl, ethyl, n-propyl, i-propyl, n-, i-, or sec-butyl, -amyl, -hexyl, -octyl, -decyl, etc. It is preferable, however, to restrict the unsaturated portion of these urethanes or ureas to allyl, buten-2-yl, buten-3-yl, or 2-styrenyl or 4-styrenyl.

Moreover, unsaturated urethanes or ureas synthesized from aryl isocyanate precursors contain more than one ring substituents, such as 2,6-diisocyano-styrene or m-isopropenyl-a,a-dimethyl-benzyl isocyanate.

$R_2$ a hydrocarbon group selected from the group consisting of alkylene, aralkylene, cycloalkylene, arylene, and alkarylene, including such radicals when inertly substituted. When $R_2$ is alkylene, it may typically be methylene, ethylene, n-propylene, iso-propylene, n-butylene, i-butylene, secbutylene, amylene, octylene, decylene, octadecylene, etc. When $R_2$ is aralkylene, it may typically be benxylene, betaphenylethylene, etc. When $R_2$ is cycloheptylene, cyclooctylene, it may typically be 2-methylcloheptylene, 3-butylcyclohexylene, 3-methycyclohexylene, etc. When $R_2$ is arylene, it may typically be phenylene, naphthylene, etc. When $R_2$ is alkarylene, it may typically be tolylene, xylylene, etc. may be inertly substituted, for instance, it may bear a non-reactive substituent such as alkyl, aryl, cycloalkyl, ether, etc. Typically, inertly substituted $R_2$ groups may include, but are not restricted to, 2-ethoxyethylene, carboethoxymethylene, 4-methyl cyclohexylene, etc. The preferred $R_2$ groups are especially the lower alkylenes containing ($C_1$-$C_{10}$) alkylene groups; for example, methylene, ethylene, n-propyl, n-butyl, namyl, n-hexyl, n-octyl, n-decyl-, etc. Moreover, the preferred alkylene group is ethylene. And, in the above formulas, R', R'', R''' consist of hydrogen and/or hydrocarbon groups selected from the group consisting of alkylene, aralkylene, cycloalkylene, arylene, and alkarylene, including those materials containing one or more heteroatoms, including oxygen, nitrogen, sulfur, or phosphorus and such radicals when inertly substituted. If one or more of the above substituents is alkylene, it may typically be methylene, ethylene n-, i-, or sec-propyl, butyl, amyl, hexyl, docyl, etc.

When one or more of the groups is aralkylene, it may typically include benxylene, betaphenylethylene, pyridine, oxazoles, phosphoxazoles, thiazoles, etc. When one or more of the aforementioned groups is cycloalkylene or heterocyloalkylene it may typically include cyclohexyl, cyclooctyl, piperdine, morpholine, furan, pyran, dioxane, etc. When one or more of the aforementioned groups is arylene, it may typically be phenyl, phenol, naphthylene, phenathiazole, thiazole, phosphothiazole, pyrrole, etc.

The following examples illustrate the (I) preparation of the reaction monomers of this invention and their subsequent use in (II) grafting.

I. PREPARATION OF MONOMERS

Example 1

Preparation of reaction adduct of isocyanato ethylmethacrylate (IEM) and 2-aminopyridine.

7.92 g (0.095 mole) of recrystallized 2-aminopyridine is dissolved in 150 mls anhydrous acetone and added dropwise to a vigorously stirring solution at 0 C to −10 C. of 15.5 g (0.10 mole) IEM dissolved in 60 mls acetone. The mixture is warmed to ambient temperature and permitted to stir for approximately 12 hours. The reaction mixture is concentrated by vacuum-removing approximately 70 mls of acetone and the impure adduct obtained by precipitating 300–500 mls of n-heptane. The adduct is recrystallized from n-hexane and dried.

The absence of an infrared isocyanate absorbance at 2284 cm-1 and the presence of urea carbonyl stretching at 1633 cm-1, urea N-H bending absorbance at 3385 cm-1 is evidence that a reaction has been effected. The ratio of C=C/C=O methacrylate stretching absorbance are identical in both monomer and adduct.

Example 2

1-(3-aminopropyl)piperdine may be substituted in the aforementioned example.

Example 3

N-aminopropyl morpholine may be substituted in the aforementioned example.

Example 4

N-methyl piperazine may be substituted in the aforementioned example.

Example 5

1-(3-aminopropyl)-2-pipecoline may be substituted in the aforementioned example.

Example 6

The reaction product adduct obtained using m-isopropenyl-a,a-dimethylbenzyl isocyanate and 2-aminopyridine.

The identical experimental design outlined in Example 1 is utilized with the exception that reaction is conducted at 50 C in tetrahydrofuran (THF).

Example 7

1-(3-aminopropyl)piperdine may be substituted in the aforementioned example.

Example 8

N-aminopropyl morpholine may be substituted in the aforementioned example.

Example 9

N-methyl piperazine may be substituted in the aforementioned example.

Example 10

1-(3-aminopropyl)-2-pipecoline may be substituted in the aforementioned example.

Example 11

4-hydroxyl-2,2,6,6-tetramethyl-piperdine may be substituted in the aforementioned example.

Example 12

2,6-di-t-butyl-4-hydroxylmethyl-phenol may be substituted in the aforementioned example.

II. GRAFTING OF MONOMERS

Example 13

Preparation of OCP-qraft-IEM-2aminopyridine

Two hundred grams of polymeric substrate consisting of about 60 mole percent ethylene and 40 mole percent propylene and having a number average molecular weight of 80,000 was dissolved in 1440 grams of solvent neutral oil at 160° C. using a mechanical stirrer while the mixture was maintained under a blanket of nitrogen. After the rubber was dissolved, the mixture was heated an additional hour at 160° C. Ten grams of monomer from Example 1 in dissolved 10 grams of solvent neutral oil was added to the above mixture along with 2.5 grams dicumyl-peroxide also dissolved in 10 grams of oil. The mixture reacted for 2.5 hours at 160° C. then filtered through a 200 mesh screen.

Example 14

Monomer from Example 2 may be substituted in the aforementioned example.

Example 15

Monomer from Example 3 may be substituted in the aforementioned example.

Example 16

Monomer from Example 4 may be substituted in the aforementioned example.

Example 17

Monomer from Example 5 may be substituted in the aforementioned example.

Example 18

Monomer from Example 6 may be substituted in the aforementioned example.

Example 19

Monomer from Example 7 may be substituted in the aforementioned example.

Example 20

Monomer from Example 8 may be substituted in the aforementioned example.

Example 21

Monomer from Example 9 may be substituted in the aforementioned example.

Example 22

Monomer from Example 10 may be substituted in the aforementioned example.

Example 23

Monomer from Example may be substituted in the aforementioned example.

Example 24

Monomer from Example 12 may be substituted in the aforementioned example.

The graft and derivatized polymer of the invention is useful as an additive for lubricating oils. Specifically, these polymeric additives behave as viscosity index improvers that impart enhanced dispersancy to lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines.

The compositions can also be used in gas engines, or turbines, automatic transmission fluids, gear lubricants, metal-working lubricants, hydraulic fluids, and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 30 weight percent. A preferred concentration range for the additive is from about 1 to 15 weight percent based on the total weight of the oil composition.

Oil concentrates of the additive may contain from about 1 to 50 weight percent of the additive reaction product in a carrier or diluent oil of lubricating oil viscosity.

The novel reaction product of the reaction may be employed in lubricating oil compositions together with conventional lubricant additives. Such additives may include additional dispersants, detergents, anti-oxidants, pour point depressants, anti-wear agents and the like.

The dispersant properties of the additive-containing oil are determined in the Bench VC Test (BVCT). Dispersancy of a lubricating oil is determined relative to three references which are the results from three standards blends tested with the unknown. The test additives were blended into a formulated oil not containing any dispersant. The additive reaction product was employed in the oil at a concentration of 12.0 weight percent polymer solution.

The product prepared in Examples 1 and 2 were blended into formulated not containing dispersant to form 1.20 weight percent polymer solutions. These blends were tested for dispersancy in the Bench VC Test (BVCT). In this test dispersancy is compared to that of three reference oils which are tested along with the experimental samples. As shown below in Table I, the numerical value of a test decreases with an increase of dispersant effectiveness.

TABLE I

| VI Improver | BVCT |
| --- | --- |
| VI Improver Performance | |
| Underivatized ethylene-propylene copolymer | 99 |
| Example 11 | 44 |
| Example 13 | 49 |
| Example 16 | 47 |
| Commercial NVP grafted DOCP | 68 |

The OCP base rubber and number average molecular weight are similar in all illustrations in Table I.

The results from the BVCT Test show that the dispersant VI improver prepared in Examples 13, and 16 gave better dispersancy performance then the corresponding OCP or to a commercial NVP grafted DOCP VI Improver.

What is claimed is:

1. A method of preparing a lubricating oil composition additive comprising:
   (a) reacting a polymer having a number average molecular weight ranging from about 5,000 to 500,000 and prepared from ethylene and at least one ($C_3$–$C_{10}$) alpha-monolefin and, optionally, a polyene selected from the group consisting of a nonconjugated diene and a triene, said polymer comprising from about 15 to 80 mole percent of ethylene, from about 20 to 85 mole percent of said ($C_3$–$C_{10}$) alpha-monoolefin and from about 0 to 15 mole percent of said polyene which has been reacted at a temperature of about 100° C., to about 250° C. with a urethane/urea, said polymer being reacted with said urethane/urea at a weight ratio ranging from about 20/1 to about 30/1, said urethane/urea being selected from the group consisting of:
   (i) an unsaturated aliphatic urethane obtained by reacting an unsaturated aliphatic isocyanate and an aliphatic or aromatic alcohol;
   (ii) an unsaturated aliphatic urea obtained by reacting an unsaturated aliphatic isocyanate and an aliphatic or aromatic amine;

(iii) an unsaturated aromatic urethane obtained by reacting an unsaturated aromatic isocyanate and an aliphatic or aromatic alcohol; and (iv) an unsaturated aromatic urea obtained by reacting an unsaturated aromatic isocyanate and an aliphatic or aromatic amine; to provide a lubricating oil composition additive product; and (b) recovering said lubricating oil composition additive product.

2. The method according to claim 1 in which said polymer has a number average molecular weight ranging from about 5,000 to about 500,000.

3. The method according to claim 1 in which said polymer has a number average molecular weight ranging from about 50,000 to about 150,000.

4. The method according to claim 1 in which said polymer comprises from about 25 to 75 mole percent ethylene and from about 20 to 75 mole percent of said ($C_3$–$C_{10}$) alpha-monoolefin.

5. The method according to claim 1 in which said polymer comprises from about 25 to 55 mole percent ethylene and from about 45 to 75 mole percent of propylene.

6. The method according to claim 1 in which said polymer contains from about 0.1 to about 10 mole percent of said polyene.

7. The method according to claim 1 in which said unsaturated aliphatic isocyanate is isocyanato ethylmethacrylate.

8. The method according to claim 1 in which said unsaturated aromatic isocyanate is m-isopropenyl-a,a-dimethylbenzyl isocyanate.

9. The method according to claim 1 in which said aliphatic alcohol compound is 4-hydroxyl-2,2,6,6-tetramethylpiperdine.

10. The method according to claim 1 in which said aromatic alcohol compound is 2,6-di-t-butyl-4-hydroxylmethylphenol.

11. The method according to claim 1 in which said aliphatic amine compound is 1-(3-aminopropyl) piperdine.

12. The method according to claim 1 in which said aliphatic amine compound is N-aminopropyl morpholine.

13. The method according to claim 1 in which said aliphatic amine compound is N-methyl piperzine.

14. The method according to claim 1 in which said aliphatic amine compound is 1-(3-aminopropyl)-2-pipecoline.

15. The method according to claim 1 in which said aromatic amine compound is 2-aminopyridine.

16. A lubricating oil composition comprising:
(a) a major amount of an oil of lubricating viscosity and
(b) a minor effective amount of a dispersant viscosity index improver additive which is prepared by
(i) reacting a polymer having a number average molecular weight ranging from about 5,000 to 500,000 and prepared from ethylene and at least one ($C_3$–$C_{10}$) alpha-monoolefin and, optionally a polyene selected from the group consisting of a non-conjugated diene and a triene; said polymer comprising from about 15 to 80 mole percent of ehtylene, about 20 to 85 mole percent of said ($C_3$–$C_{10}$) alpha-monoolefin and from about 0 to 15 mole percent of said polyene which has been reacted at a temperature of about 100° C. to about 250° C. with a urethane/urea, said polymer being reacted with said urethane/urea at a weight ratio ranging from about 20/1 to about 30/1, said urethane/urea being selected from the group consisting of:

(i) an unsaturated aliphatic urethane obtained by reacting an unsaturated aliphatic isocyanate and an aliphatic or aromatic alcohol;

(ii) an unsaturated aliphatic urea obtained by reacting an unsaturated aliphatic isocyanate and an aliphatic or aromatic amine;

(iii) an unsaturated aromatic urethane obtained by reacting an unsaturated aromatic isocyanate and an aliphatic or aromatic alcohol; and (iv) an unsaturated aromatic urea obtained by reacting an unsaturated aromatic isocyanate and an aliphatic or aromatic amine; to provide a lubricating oil composition additive product; and (b) recovering said lubricating oil composition additive product.

17. The lubricating oil composition according to claim 16 wherein said composition contains from about 0.1 to 30 weight percent of said additive based on the total weight of the oil composition.

18. The lubricating oil composition according to claim 16 wherein said composition contains from about 1 to 15 weight percent of said additive based on the total weight of the oil composition.

19. The lubricating oil composition according to claim 16 in which said polymer comprises from about 25 to 75 mole percent ethylene and from about 25 to 75 mole percent of a ($C_3$–$C_8$) alpha-monoolefin and has a number average molecular weight ranging from about 25,000 to 250,000.

20. The lubricating oil composition according to claim 16 in which said unsaturated aliphatic isocyanate is isocyanato ethylmethacrylate.

21. The lubricating oil composition according to claim 16 in which said unsaturated aromatic isocyanate is m-isopropenyl-a,a-dimethylbenzyl isocyanate.

22. The lubricating oil composition according to claim 16 in which said aliphatic amine compound is 1-(3-aminopropyl)piperdine.

23. The lubricating oil composition according to claim 16 in which said aliphatic amine compound is N-aminopropylmorpholine.

24. The lubricating oil composition according to claim 16 in which said aliphatic amine is N-methyl piperazine.

25. The lubricating oil composition according to claim 16 in which said aliphatic alcohol is 4-hydroxyl-2,2,6,6-tetramethyl-piperdine.

26. The method according to claim 1 in which said aromatic alcohol compound is 2,6-di-t-butyl-4-hydroxylmethylphenol.

27. The method according to claim 1 in which said aromatic amine is 2-amino-pyridine.

28. A concentrate for a lubricating oil comprising a diluent oil of lubricant viscosity and from about 1 to 50 weight percent of the additive composition of claim 1 based on the total weight of the concentrate.

* * * * *